(12) United States Patent
Sloyer et al.

(10) Patent No.: US 8,739,046 B2
(45) Date of Patent: May 27, 2014

(54) DYNAMIC E-MEETING SUMMARIZATION

(75) Inventors: Jeffrey B. Sloyer, Fishersville, VA (US); Chelsea Christine Beerse, Fairport, NY (US); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/101,205

(22) Filed: May 5, 2011

(65) Prior Publication Data
US 2012/0284640 A1    Nov. 8, 2012

(51) Int. Cl.
*G06F 3/00* (2006.01)

(52) U.S. Cl.
USPC .......... 715/753; 709/204; 348/14.08

(58) Field of Classification Search
None
See application file for complete search history.

(56) References Cited

U.S. PATENT DOCUMENTS

| | | | |
|---|---|---|---|
| 7,298,930 B1 * | 11/2007 | Erol et al. ............... | 382/305 |
| 7,308,476 B2 | 12/2007 | Mannaru et al. | |
| 7,657,614 B2 | 2/2010 | Gyorfi et al. | |
| 7,756,923 B2 * | 7/2010 | Caspi et al. ............. | 709/204 |
| 2006/0031290 A1 * | 2/2006 | Mannaru et al. ........ | 709/204 |
| 2006/0171515 A1 * | 8/2006 | Hintermeister et al. . | 379/110.01 |
| 2008/0137558 A1 | 6/2008 | Baird | |
| 2009/0119704 A1 | 5/2009 | Dimitrova et al. | |
| 2012/0197630 A1 * | 8/2012 | Lyons et al. ............ | 704/9 |

* cited by examiner

*Primary Examiner* — Stephen Hong
*Assistant Examiner* — Asher Kells
(74) *Attorney, Agent, or Firm* — Holland & Knight LLP; Brian J. Colandreo, Esq.; Jeffrey T. Placker, Esq.

(57) ABSTRACT

A method, computer program product, and system for dynamic e-meeting summarization is described. A method may comprise monitoring behavior of an e-meeting participant and determining one or more portions of an e-meeting to summarize for the e-meeting participant based upon, at least in part, the behavior of the e-meeting participant. The method may further comprise determining a summary-content time-frame for the e-meeting participant based upon, at least in part, the one or more portions of the e-meeting to summarize for the e-meeting participant, the summary-content time-frame corresponding to an amount of time for the e-meeting participant to consume a summary of the e-meeting. The method may additionally comprise generating, during the e-meeting, the summary of the e-meeting in accordance with the summary-content time-frame for the e-meeting participant, the summary of the e-meeting based upon, at least in part, the one or more portions of the e-meeting.

25 Claims, 5 Drawing Sheets

User 46 Q1 Sales Meeting Summary

USER 46 TEXT ONLY SUMMARY

Jim James will speak for the first half of the meeting and Bob Roberts will speak for the second half of the meeting.

Quarter 1 started slow but eventually the company turned out good numbers. The Northeast region had a great quarter 1 but the Southwest region could have done better. Product line A sold very well but product line B moved slowly because of design flaws. Historically it turned out to be an average quarter 1 because of the sales push in March.

Product line B will be taken off the market in quarter 2. It will be replaced with product line C. Product line C will be designed in the Northeast region. Advertising for product line A in the Southwest region will be increased.

FIG. 5

DYNAMIC E-MEETING SUMMARIZATION

BACKGROUND OF THE INVENTION

E-meeting participants may join an e-meeting late for a variety of reasons. For example, they may forget about the e-meeting until they notice it in their calendar, they may be invited to the e-meeting sometime after the e-meeting starts, or their previous engagement (e.g., conference, telephone call, etc.) may have run over time. Further, e-meeting participants may have to leave an e-meeting and then rejoin the e-meeting at a later time, or may have to focus their attention to another matter during an e-meeting. In either case, the e-meeting participant may have missed one or more portions of the e-meeting.

BRIEF SUMMARY OF THE INVENTION

In a first embodiment, a method may include monitoring, via one or more computing devices, behavior of an e-meeting participant. The method may further include determining, via the one or more computing devices, one or more portions of an e-meeting to summarize for the e-meeting participant based upon, at least in part, the behavior of the e-meeting participant. The method may also include determining, via the one or more computing devices, a summary-content time-frame for the e-meeting participant based upon, at least in part, the one or more portions of the e-meeting to summarize for the e-meeting participant, the summary-content time-frame corresponding to an amount of time for the e-meeting participant to consume a summary of the e-meeting. The method may additionally include generating, via the one or more computing devices, during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content. Moreover, the method may include providing, via the one or more computing devices, the e-meeting participant with access to the summary of the e-meeting, during the e-meeting, via a graphical user interface associated, at least in part, with an application through which the e-meeting is accessed.

One or more of the following features may be included. The method may include updating the summary of the e-meeting, during the e-meeting, in real-time. The summary of the e-meeting may be available to the e-meeting participant, at least in part, via a private channel that is non-disruptive to other attendees of the e-meeting. At least one of the graphical user interface and the private channel may be configured to allow the e-meeting participant to at least one of: pause the summary of the e-meeting, and toggle between the summary of the e-meeting and the e-meeting. The behavior of the e-meeting participant used to determine the one or more portions of the e-meeting to summarize for the e-meeting participant may be, at least in part, at least one of: e-meeting participant attendance, an e-meeting participant join time, an e-meeting participant leave time, an e-meeting participant rejoin time, and an e-meeting participant attention metric. The summary-content time-frame for the e-meeting participant may be determined based upon, at least in part, at least one of: a defined e-meeting participant preference for the summary-content time-frame, e-meeting time elapsed, e-meeting time remaining, an amount of data exchanged during the e-meeting, an amount of content exchanged during the e-meeting, an e-meeting introduction time, and an e-meeting conclusion time.

In an implementation the summary of the e-meeting may be a text only summary and a length of the text-only summary may be based upon, at least in part, the summary-content time-frame for the e-meeting participant and, at least one of: an average reading rate, and the participant's average reading rate. Providing the e-meeting participant with access to the summary of the e-meeting may include making the summary of the e-meeting available to the participant of the e-meeting when the e-meeting participant joins the e-meeting. The summary of the e-meeting may include one or more presentation slides of the e-meeting with corresponding audio content based upon, at least in part, the one or more portions of the e-meeting to summarize for the e-meeting participant and the summary-content time-frame for the e-meeting participant.

In a second embodiment, a computer program product may reside on a computer readable storage medium and may have a plurality of instructions stored on it. When executed by a processor, the instructions may cause the processor to perform operations including monitoring behavior of an e-meeting participant. The operations may further include determining one or more portions of an e-meeting to summarize for the e-meeting participant based upon, at least in part, the behavior of the e-meeting participant. The operations may also include determining a summary-content time-frame for the e-meeting participant based upon, at least in part, the one or more portions of the e-meeting to summarize for the e-meeting participant, the summary-content time-frame corresponding to an amount of time for the e-meeting participant to consume a summary of the e-meeting. The operations may additionally include generating during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content. Moreover, the operations may include providing the e-meeting participant with access to the summary of the e-meeting, during the e-meeting, via a graphical user interface associated, at least in part, with an application through which the e-meeting is accessed.

One or more of the following features may be included. The operations may include updating the summary of the e-meeting, during the e-meeting, in real-time. The summary of the e-meeting may be available to the e-meeting participant, at least in part, via a private channel that is non-disruptive to other attendees of the e-meeting. At least one of the graphical user interface and the private channel may be configured to allow the e-meeting participant to at least one of: pause the summary of the e-meeting, and toggle between the summary of the e-meeting and the e-meeting. The behavior of the e-meeting participant used to determine the one or more portions of the e-meeting to summarize for the e-meeting participant may be at least in part, at least one of: e-meeting participant attendance, an e-meeting participant join time, an e-meeting participant leave time, an e-meeting participant rejoin time, and an e-meeting participant attention metric. The summary-content time-frame for the e-meeting participant may be determined based upon, at least in part, at least one of: a defined e-meeting participant preference for the summary-content time-frame, e-meeting time elapsed, e-meeting time remaining, an amount of data exchanged during the e-meeting, an amount of content exchanged during the e-meeting, an e-meeting introduction time, and an e-meeting conclusion time.

In an implementation, the summary of the e-meeting may be a text only summary and a length of the text-only summary may be based upon, at least in part, the summary-content time-frame for the e-meeting participant and, at least one of: an average reading rate, and the participant's average reading rate. Providing the e-meeting participant with access to the summary of the e-meeting may include making the summary of the e-meeting available to the participant of the e-meeting when the e-meeting participant joins the e-meeting. The summary of the e-meeting may include one or more presentation slides of the e-meeting with corresponding audio content based upon, at least in part, the one or more portions of the e-meeting to summarize for the e-meeting participant and the summary-content time-frame for the e-meeting participant.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to monitor behavior of an e-meeting participant. Further, the computing system may include a second software module which may be configured to determine one or more portions of an e-meeting to summarize for the e-meeting participant based upon, at least in part, the behavior of the e-meeting participant. Additionally, the computing system may include a third software module which may be configured to determine a summary-content time-frame for the e-meeting participant based upon, at least in part, the one or more portions of the e-meeting to summarize for the e-meeting participant, the summary-content time-frame corresponding to an amount of time for the e-meeting participant to consume a summary of the e-meeting. Also, the computing system may include a fourth software module which may be configured to generate during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content. Moreover, the computing system may include a fifth software module which may be configured to provide the e-meeting participant with access to the summary of the e-meeting, during the e-meeting, via a graphical user interface associated, at least in part, with an application through which the e-meeting is accessed.

One or more of the following features may be included. The computing system may include a fifth software module which may be configured to update the summary of the e-meeting, during the e-meeting, in real-time. The summary of the e-meeting may be available to the e-meeting participant, at least in part, via a private channel that is non-disruptive to other attendees of the e-meeting. At least one of the graphical user interface and the private channel may be configured to allow the e-meeting participant to at least one of: pause the summary of the e-meeting, and toggle between the summary of the e-meeting and the e-meeting. The behavior of the e-meeting participant used to determine the one or more portions of the e-meeting to summarize for the e-meeting participant may be, at least in part, at least one of: e-meeting participant attendance, an e-meeting participant join time, an e-meeting participant leave time, an e-meeting participant rejoin time, and an e-meeting participant attention metric.

The summary-content time-frame for the e-meeting participant may be determined based upon, at least in part, at least one of: a defined e-meeting participant preference for the summary-content time-frame, e-meeting time elapsed, e-meeting time remaining, an amount of data exchanged during the e-meeting, an amount of content exchanged during the e-meeting, an e-meeting introduction time, and an e-meeting conclusion time.

In an implementation, the summary of the e-meeting may be a text only summary and a length of the text-only summary may be based upon, at least in part, the summary-content time-frame for the e-meeting participant and, at least one of: an average reading rate, and the participant's average reading rate. Providing the e-meeting participant with access to the summary of the e-meeting may include making the summary of the e-meeting available to the participant of the e-meeting when the e-meeting participant joins the e-meeting. The summary of the e-meeting may include one or more presentation slides of the e-meeting with corresponding audio content based upon, at least in part, the one or more portions of the e-meeting to summarize for the e-meeting participant and the summary-content time-frame for the e-meeting participant.

The details of one or more implementations are set forth in the accompanying drawings and the description below. Other features and advantages will become apparent from the description, the drawings, and the claims.

DETAILED DESCRIPTION OF THE INVENTION

Figure 1:
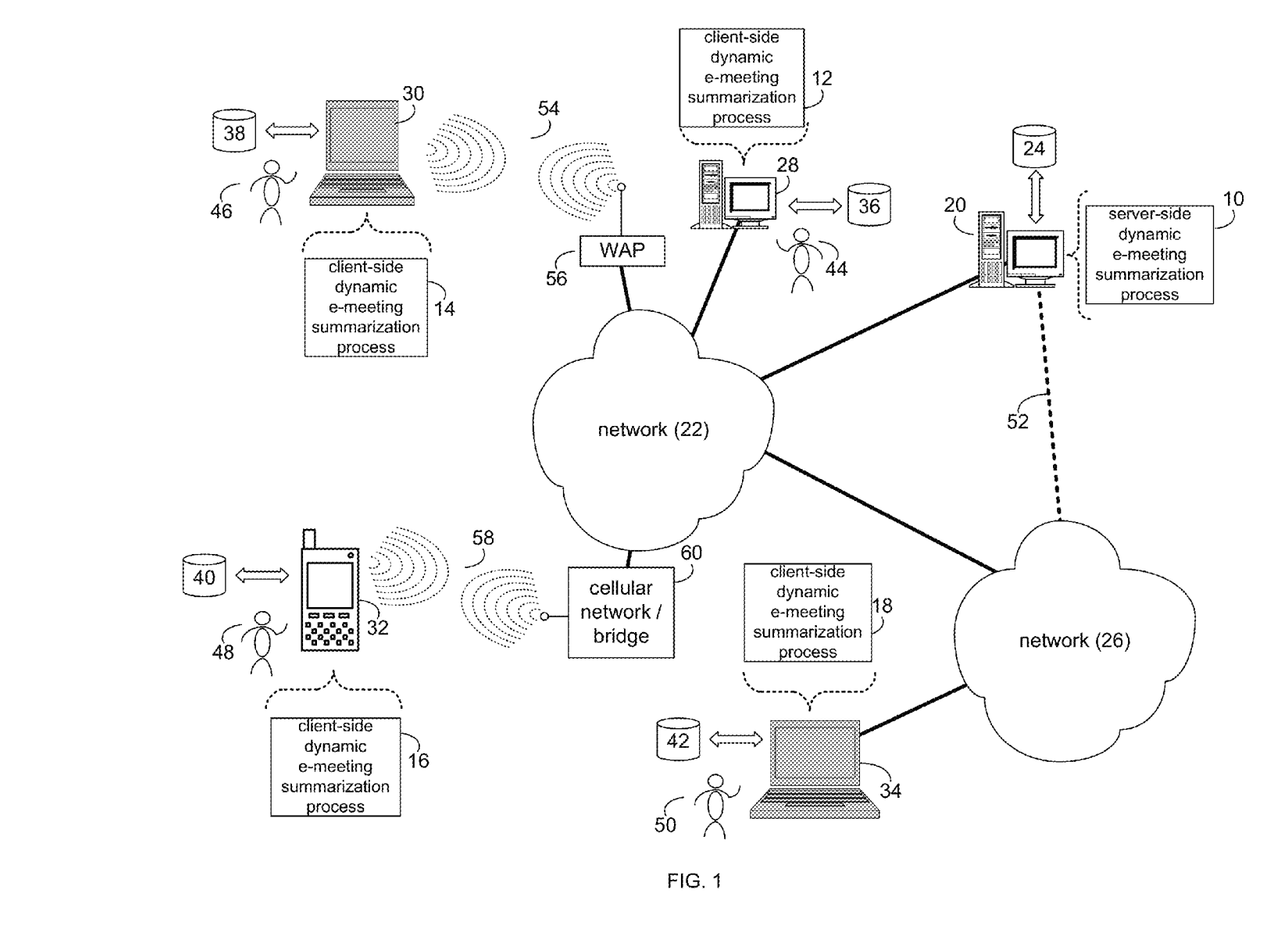
FIG. 1 is a diagrammatic view of a dynamic e-meeting summarization process coupled to a distributed computing network.
Figure 2:
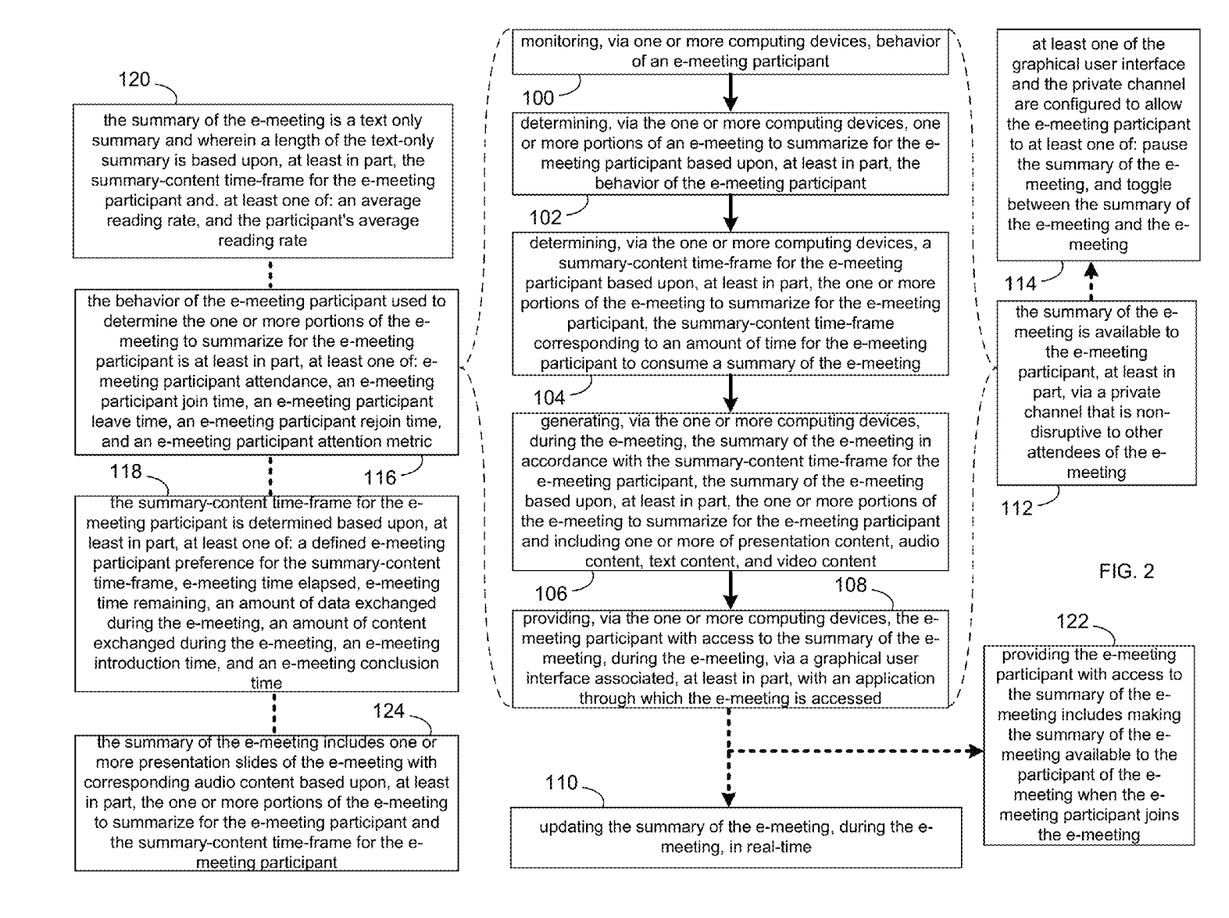
FIG. 2 is a flowchart of the dynamic e-meeting summarization process of FIG. 1.

Referring to FIGS. 1 & 2, there is shown a dynamic e-meeting summarization process 10. As will be discussed below, dynamic e-meeting summarization process 10 may monitor 100, behavior of an e-meeting participant. dynamic e-meeting summarization process 10 may also determine 102 one or more portions of an e-meeting to summarize for the e-meeting participant based upon, at least in part, the behavior of the e-meeting participant. dynamic e-meeting summarization process 10 may also determine 104 a summary-content time-frame for the e-meeting participant based upon, at least in part, the one or more portions of the e-meeting to summarize for the e-meeting participant, the summary-content time-frame corresponding to an amount of time for the e-meeting participant to consume a summary of the e-meeting. Additionally, dynamic e-meeting summarization process 10 may generate 106, during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content. Moreover, dynamic e-meeting summarization process 10 may provide 108, via the one or more computing devices, the e-meeting participant with access to the summary of the e-meeting, during the e-meeting, via a graphical user interface associated, at least in part, with an application through which the e-meeting is accessed.

The dynamic e-meeting summarization (DES) process may be a server-side process (e.g., server-side DES process 10), a client-side process (e.g., client-side DES process 12, client-side DES process 14, client-side DES process 16, or client-side DES process 18), or a hybrid server-side/client-side process (e.g., the combination of server-side DES process 10 and one or more of client-side DES processes 12, 14, 16, 18).

Server-side DES process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side DES process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side DES processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side DES processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side DES processes 12, 14, 16, 18 and/or server-side DES process 10 may be processes that run within (i.e., are part of) a unified communications and collaboration application (e.g., Lotus® Sametime®). Alternatively, client-side DES processes 12, 14, 16, 18 and/or server-side DES process 10 may be stand-alone applications that work in conjunction with the unified communications and collaboration application. One or more of client-side DES processes 12, 14, 16, 18 and server-side DES process 10 may interface with each other (via network 22 and/or network 26).

Users 44, 46, 48, 50 may access server-side DES process 10 directly through the device on which the client-side DES process (e.g., client-side DES processes 12, 14, 16, 18) is executed, namely client electronic devices 28, 30, 32, 34, for example. Users 44, 46, 48, 50 may access server-side DES process 10 directly through network 22 and/or through secondary network 26. Further, server computer 20 (i.e., the computer that executes server-side DES process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Dynamic E-Meeting Summarization (DES) Process

For the following discussion, server-side DES process 10 will be described for illustrative purposes. It should be noted that client-side DES process 12 may be incorporated into server-side DES process 10 and may be executed within one or more applications that allow for communication with client-side DES process 12. However, this is not intended to be a limitation of this disclosure, as other configurations are possible (e.g., stand-alone, client-side DES processes and/or stand-alone server-side DES processes.) For example, some implementations may include one or more of client-side DES processes 12, 14, 16, 18 in place of or in addition to server-side DES process 10.

Figure 3:
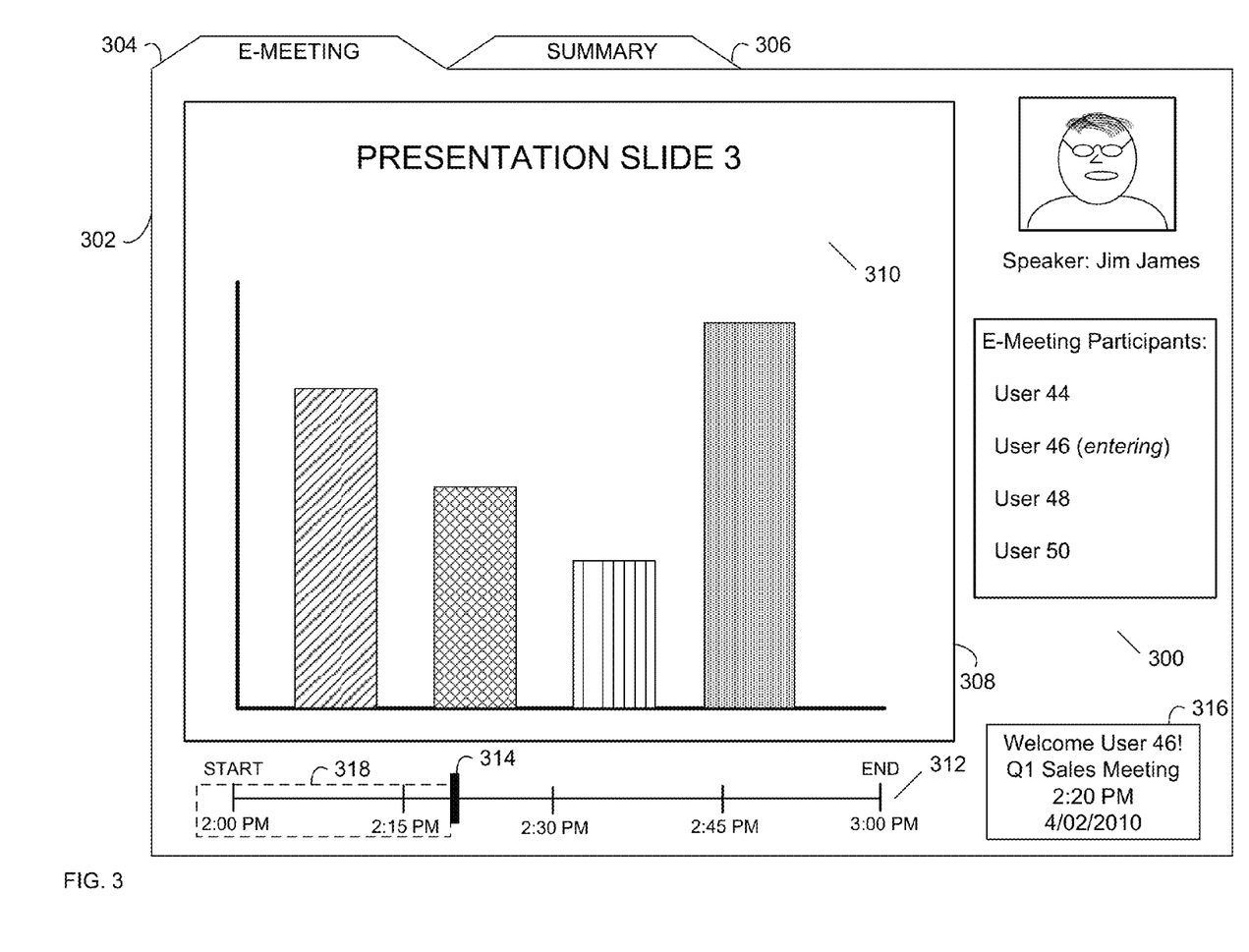
FIG. 3 is an exemplary graphical user interface which may be associated with the dynamic e-meeting summarization of FIG. 1.

Referring now to FIGS. 1-3, one or more of users 44, 46, 48, and 50 may be e-meeting participants and may be invited to an e-meeting (e.g., e-meeting 300). E-meeting 300 may be conducted via a unified communications and collaboration application (e.g., Lotus® Sametime®). E-meeting 300 may be a meeting, presentation, or other type of collaborative gathering. Further, e-meeting 300 may be attended online, and audio associated with e-meeting 300 may be broadcasted to one or more e-meeting participants (e.g., one or more of users 44, 46, 48, 50). In an implementation, audio associated with e-meeting 300 may be streamed to many e-meeting participants (e.g., one or more of users 44, 46, 48, 50) or may be accessed via teleconference.

E-meeting 300 may be accessed by, e.g., user 46, via a graphical user interface (GUI) associated with the unified communications and collaboration application. For example, user 46 may enter e-meeting 300 and may access e-meeting presentation content via GUI 302. GUI 302 may include one or more tabs (e.g., tabs 304, 306) through which user 46 may access presentation material associated with e-meeting 300. GUI 302 may further include content window 308 through which user 46 may access presentation content (e.g., presentation slide 310). Other presentation content which user 46 may access through content window 308 may include, but is not limited to, presentation video, presentation documents, and other presentation information. An e-meeting participant (e.g., user 46) may also access presentation audio via GUI 302. Additionally, GUI 302 may display presentation time line 312, which may indicate a scheduled time-frame of the presentation and a current position (e.g., via position indicator 314) of the e-meeting.

DES process 10 may monitor 100 behavior of an e-meeting participant (e.g., one or more of users 44, 46, 48, 50). For example, DES process 10 may monitor and/or detect when (e.g., at what time) user 46 enters e-meeting 300. As shown in FIG. 3, user 46 may enter e-meeting 300 via GUI 302 at a time (e.g., 2:20 PM as indicated by position indicator 314 and/or meeting status window 316) after e-meeting 300 has begun (e.g. 2:00 PM as indicated by presentation timeline 312). As such, in this non-limiting example, DES process 10 may detect that user 46 has entered e-meeting 300 at 2:20 PM, by, at least in part, monitoring 100 behavior of user 46.

Continuing with the above example, DES process 10 may determine 102 one or more portions (e.g., portion 318) of an e-meeting (e.g., e-meeting 300) to summarize for the e-meeting participant (e.g., user 46) based upon, at least in part, the behavior of the e-meeting participant (e.g., user 46). As discussed in the example above, user 46 may enter e-meeting 300 at 2:20 PM, which may be, for example, 20 minutes after e-meeting 300 has begun. DES process 10 may determine, based upon, at least in part, user 46's behavior in joining the e-meeting late, that user 46 may need a summary of the first 20 minutes of the e-meeting. The behavior of the e-meeting participant (e.g., user 46) used to determine 102 the one or more portions (e.g., portion 318) of the e-meeting to summarize for the e-meeting participant (e.g., portion 318) may be (116) at least in part, at least one of: e-meeting participant attendance, an e-meeting participant join time, an e-meeting participant leave time, an e-meeting participant rejoin time, and an e-meeting participant attention metric. These types of behavior may be monitored, by DES process 10, through one or more of the unified communications and collaboration application and/or a calendaring and scheduling application used by user 46.

E-meeting participant attendance may be used, for example, to determine if user 46 needs all of e-meeting 300 summarized. DES process 10 may, by monitoring user 46's calendar, determine that user 46 does not plan on attending e-meeting 300. In this situation, user 46 may need all of e-meeting 300 summarized. Further, if user 46 does plan on attending e-meeting 300, but DES process 10 determines that user 46 never joined e-meeting 300, DES process 10 may determine that user 46 needs all of e-meeting 300 summarized.

Continuing with the example above, user 46 may join e-meeting 300 at 2:20 PM, may leave e-meeting 300 at 2:30 PM, and may rejoin e-meeting 300 again at 2:40 PM. By monitoring this behavior of user 46, DES process 10 may determine that user 46 was not present in the meeting between 2:30 PM and 2:40 PM, and may further determine that the one or more portions (e.g., portion 318) of e-meeting 300 to summarize for user 46 include not only portion 318 (e.g., 2:00 PM-2:20 PM) but also the portion corresponding to 2:30 PM-2:40 PM of e-meeting 300. In this way, DES process 10 may monitor user 46's behavior as he/she may join, leave, and rejoin e-meeting 300 in order to determine which portions of e-meeting 300 to summarize for user 46.

In an implementation, DES process 10 may use an e-meeting participant attention metric to determine if user 46 needs one or more portions of e-meeting 300 summarized. In an example, user 46 may have joined e-meeting 300 but may not pay attention to e-meeting 300 for one or more reasons. For illustrative purposes only, assume that while user 46 has joined e-meeting 300 at 2:20 PM, he/she has also signed onto an instant messaging (IM) system, opened up a web-browser, and opened up an email application. By monitoring user 46's attention to these activities (e.g., by determining a z-order of windows open on user 46's system and/or detecting user 46's use of a keyboard or mouse), DES process 10 may calculate an e-meeting participant attention metric corresponding to user 46's attention with respect to e-meeting 300. Based upon, at least in art, the e-meeting participant attention metric level of user 46 during various portions of e-meeting 300, DES process 10 may determine one or more portions of e-meeting 300 to summarize for meeting 46. For example, assume that after joining e-meeting 300 at 2:20 PM, user 46 types an email from 2:30 PM-2:35 PM, visits a web site from 2:35 PM-2:40 PM, and chats via IM from 2:40 PM-2:45 PM. DES process 10 may determine that user 46 needs a summary for the portion corresponding to 2:30 PM-2:45 PM of e-meeting 300.

Figure 4:
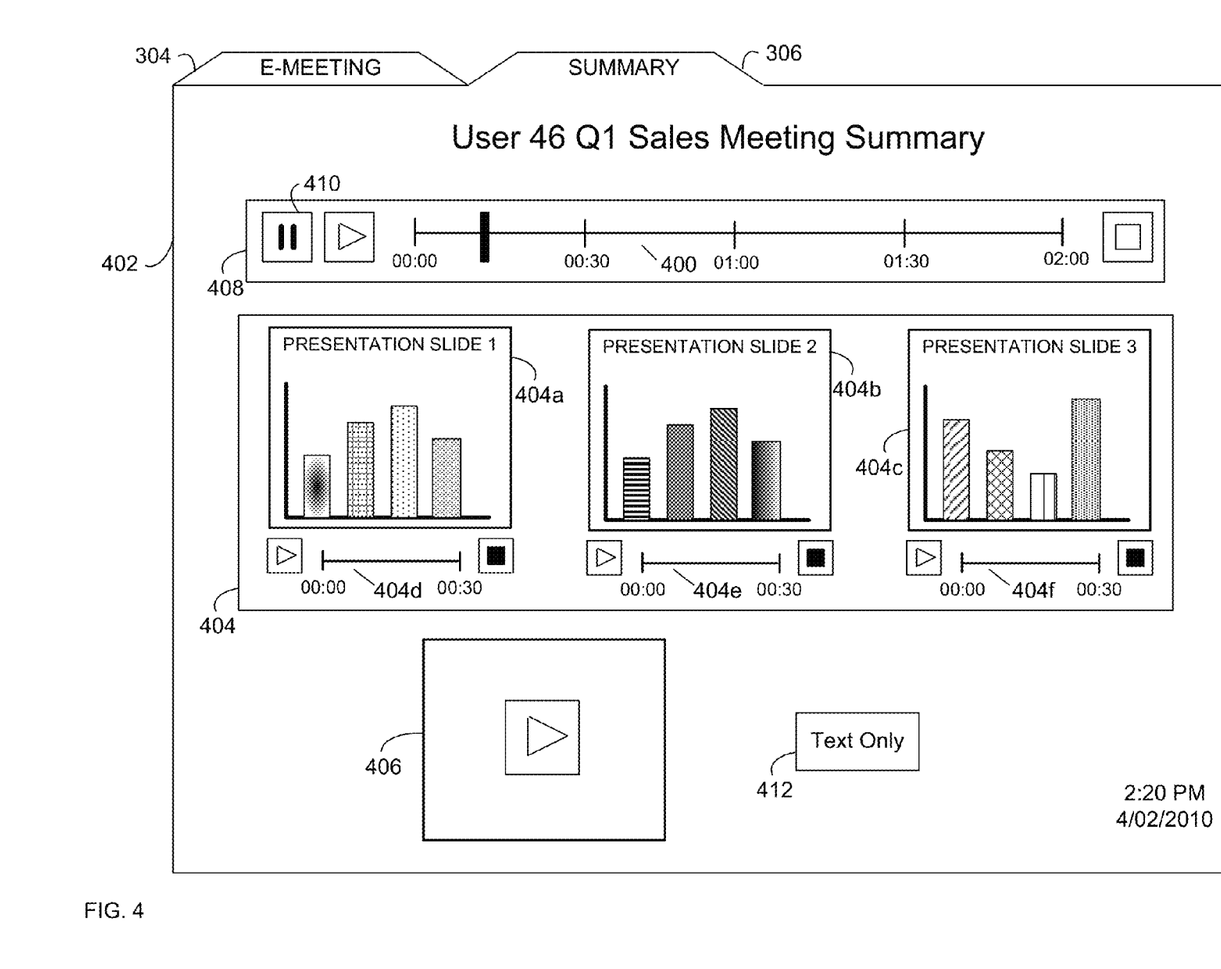
FIG. 4 is also an exemplary graphical user interface which may be associated with the dynamic e-meeting summarization of FIG. 1.

Referring now also to FIG. 4, DES process 10 may further determine 104 a summary-content time-frame (e.g., 2 minutes as shown by audio content 400) for the e-meeting participant (e.g., user 46) based upon, at least in part, the one or more portions of the e-meeting to summarize for the e-meeting participant (e.g., portion 318), the summary-content time-frame corresponding to an amount of time for the e-meeting participant (e.g., user 46) to consume a summary (e.g., one or more of audio content 400, presentation content 404, video content 406, and text content 502) of the e-meeting (e.g., e-meeting 300). The summary-content time-frame for the e-meeting participant (e.g., user 46) may be (118) determined 104 based upon, at least in part, at least one of: a defined e-meeting participant preference for the summary-content time-frame, e-meeting time elapsed, e-meeting time remaining, an amount of data exchanged during the e-meeting, an amount of content exchanged during the e-meeting, an e-meeting introduction time, and an e-meeting conclusion time. The defined e-meeting participant preference for the summary-content time-frame may be set by user 46 via the unified communications and collaboration application. For example, user 46 may define his/her preference for the summary-content time-frame as 10% of the one or more portions to summarize. As discussed above, and shown in FIG. 3, if user 46 misses the first 20 minutes of e-meeting 300, DES process 10 may determine, based upon, at least in part, the defined 10% preference for the summary-content time-frame, that the summary-content time-frame should be 2 minutes.

In the example above, DES process 10 may determine that user 46 missed the first 20 minutes of e-meeting 300 by determining that 20 minutes elapsed in e-meeting 300 (e.g., e-meeting time elapsed) by the time user 46 joined e-meeting 300. Further, DES process 10 may determine that user 46 missed the first 20 minutes of e-meeting 300 by determining that 40 minutes remained in e-meeting 300 (e.g., e-meeting time remaining) by the time user 46 joined e-meeting 300. In an implementation, DES process 10 may determine an e-meeting introduction time and/or an e-meeting conclusion time. DES process 10 may use one or both of e-meeting introduction time and/or an e-meeting conclusion time when determining the summary-content time-frame. Assume for illustrative purposes that a first presentation slide of e-meeting 300 is labeled "introduction". Further, assume that a presenter (e.g., speaker Jim James) spends 5 minutes on the first presentation slide. Based upon, at least in part, a preference that may be defined by user 46 in the unified communications and collaboration application, DES process 10 may determine that this introduction portion of e-meeting 300 need not be summarized for user 46, and may thus determine that the summary-content time-frame is 1 minute and 30 seconds (e.g., 20 minutes missed by user 46, minus 5 minutes of introduction, times 0.10 (i.e., 10%), is 1 minute and 30 seconds). As such, when generating a summary of e-meeting 300 for user 46, DES process 10 may bypass the first 5 minutes of portion 318, and generate a 1 minute and 30 second summary of the next 15 minutes of e-meeting 300 for user 46. In a similar way, if DES process 10 determines that a portion of e-meeting 300 to summarize for user 46 is the last 20 minutes, that the last presentation slide is labeled "conclusion", and that the presenter spends five minutes on the last presentation slide, DES process 10 may similarly determine that the summary-content time frame is 1 minute and 30 seconds. As such, when generating a summary of e-meeting 300 for user 46, DES process 10 may bypass the last 5 minutes of this portion, and generate a 1 minute and 30 second summary of the last 15 minutes of e-meeting 300, not counting the last 5 minutes, for user 46.

Further, DES process 10 may use one or both of an amount of data exchanged during the e-meeting (e.g., e-meeting 300) or an amount of content exchanged during the e-meeting (e.g., e-meeting 300) when determining the summary-content time-frame. Assume, for example, that 2 megabytes (MB) of data is exchanged during the first 20 minutes of e-meeting 300. Based upon, at least in part, one or more preferences set by user 46 via the unified communications and collaboration application, DES process 10 may determine that the summary-content time-frame should be 2 minutes (e.g., 1 minute per MB). The summary-content time-frame may further be based upon, at least in part, what type of data is exchanged (e.g., 1 minute per MB of video data, 10 minutes per MB of text data, etc.). In another example, assume that 10 presentation slides of content is exchanged during the first 10 minutes of e-meeting 300. Based upon, at least in part, one or more preferences set by user 46 via the unified communications and collaboration application, DES process 10 may determine that the summary-content time-frame should be 2 minutes (e.g., 1 minute for every 5 slides). The summary-content time-frame may further be based upon, at least in part, what type of content is exchanged (e.g., 1 minute for every 20 pages of text data, etc.). While various preferences that may be set by user 46 to determine the summary-content time-frame are mentioned above (e.g., 1 minute per MB, 1 minute per MB of video data, 10 minutes per MB of text data, 1 minute for every 5 slides, 1 minute for every 20 pages of text data, etc.), it should be noted that these preferences are discussed for illustrative purposes only, and any number of other preferences may be set by user 46.

As mentioned above, and referring now also to FIGS. 4 and 5, DES process 10 may generate 106 during the e-meeting (e.g., e-meeting 300), the summary (e.g., one or more of one or more of audio content 400, presentation content 404, video content 406, and text content 502) of the e-meeting (e.g., e-meeting 300) in accordance with the summary-content time-frame for the e-meeting participant (e.g., user 46), the summary (e.g., one or more of one or more of audio content 400, presentation content 404, video content 406, and text content 502) of the e-meeting (e.g., e-meeting 300) based upon, at least in part, the one or more portions (e.g., portion 318) of the e-meeting to summarize for the e-meeting participant (e.g., user 46) and including one or more of presentation content (e.g., presentation content 404), audio content (e.g., audio content 400), text content (e.g., text content 502), and video content (e.g., video content 406). The summary of the e-meeting (e.g., e-meeting 300) may include (124) one or more presentation slides (e.g., presentation slides 404a, 404b, 404c) of the e-meeting with corresponding audio content (e.g., audio content 404d, 404e, 404f) based upon, at least in part, the one or more portions (e.g., portion 318) of the e-meeting (e.g., e-meeting 300) to summarize for the e-meeting participant (e.g., user 46) and the summary-content time-frame (e.g., 2 minutes) for the e-meeting participant (e.g., user 46).

Further, DES process 10 may provide 108 the e-meeting participant (e.g., user 46) with access to the summary (e.g., one or more of one or more of audio content 400, presentation content 404, video content 406, and text content 502) of the e-meeting (e.g., e-meeting 300), during the e-meeting (e.g., e-meeting 300), via a GUI (e.g., GUI 402) associated, at least in part, with an application (e.g., a unified communications and collaboration application) through which the e-meeting (e.g., e-meeting 300) may be accessed. For example, user 46 may access one or more of one or more of audio content 400, presentation content 404, video content 406, and text content 502 during e-meeting 300 by selecting tab 306. Providing 108 the e-meeting participant with access to the summary (e.g., one or more of one or more of audio content 400, presentation content 404, video content 406, and text content 502) of the e-meeting may include (122) making the summary (e.g., one or more of one or more of audio content 400, presentation content 404, video content 406, and text content 502) of the e-meeting (e.g., e-meeting 300) available to the participant (e.g., user 46) of the e-meeting when the e-meeting participant (e.g., user 46) joins the e-meeting (e.g., e-meeting 300). For example, and referring now to FIG. 3, upon joining e-meeting 300, user 46 may be presented with GUI 302, which may include tabs 304 and 306. To view the summary (e.g., one or more of audio content 400, presentation content 404, video content 406, and text content 502), user 46 may select tab 306. In response to receiving a selection of tab 306, DES process 10 may render GUI 402, as shown in FIG. 4, for example, which may allow user 46 to access one or more of audio content 400, presentation content 404, video content 406, and text content 502, any of which may be summary content of e-meeting 300.

In an implementation, the summary of the e-meeting (e.g., audio content 400) may be available (112) to the e-meeting participant (e.g., user 46), at least in part, via a private channel (e.g., via audio player 408) that is non-disruptive to other attendees (e.g., one or more of users 44, 48, 50) of the e-meeting (e.g., e-meeting 300). For example, upon joining e-meeting 300, user 46 may wish to consume a summary of e-meeting 300 without disturbing others present (e.g., one or more of users 44, 48, 50) at the e-meeting. Upon rendering GUI 402, DES process 10 may allow user 46 to listen to audio content 400 via audio player 408, which may be a private channel dedicated to user 46 and may be undetectable to one or more of users 44, 48, 50. If e-meeting 300 includes audio via teleconference, DES process 10 may provide a private line to user 46 through which user 46 may consume audio content 400. Further, at least one of the GUI (e.g., GUI 402) and the private channel (e.g., via audio player 408) may be configured (114) to allow the e-meeting participant (e.g., user 46) to at least one of: pause the summary (e.g., via pause button 410 of audio player 408) of the e-meeting, and toggle between the summary of the e-meeting (e.g., one or more of audio content 400, presentation content 404, video content 406, and text content 502) and the e-meeting (e.g., e-meeting 300). For example, by selecting pause button 410, user 46 may pause the rendering of audio content 400. Additionally, by selecting tabs 304 and/or 306, user 46 may toggle between e-meeting 300, as shown in FIG. 3, and the summary of the e-meeting (e.g., one or more of audio content 400, presentation content 404, video content 406, and text content 502), as shown in FIG. 4. Further, in response to receiving a selection of tab 304, DES process 10 may render GUI 302 and automatically pause audio player 408.

Figure 5:
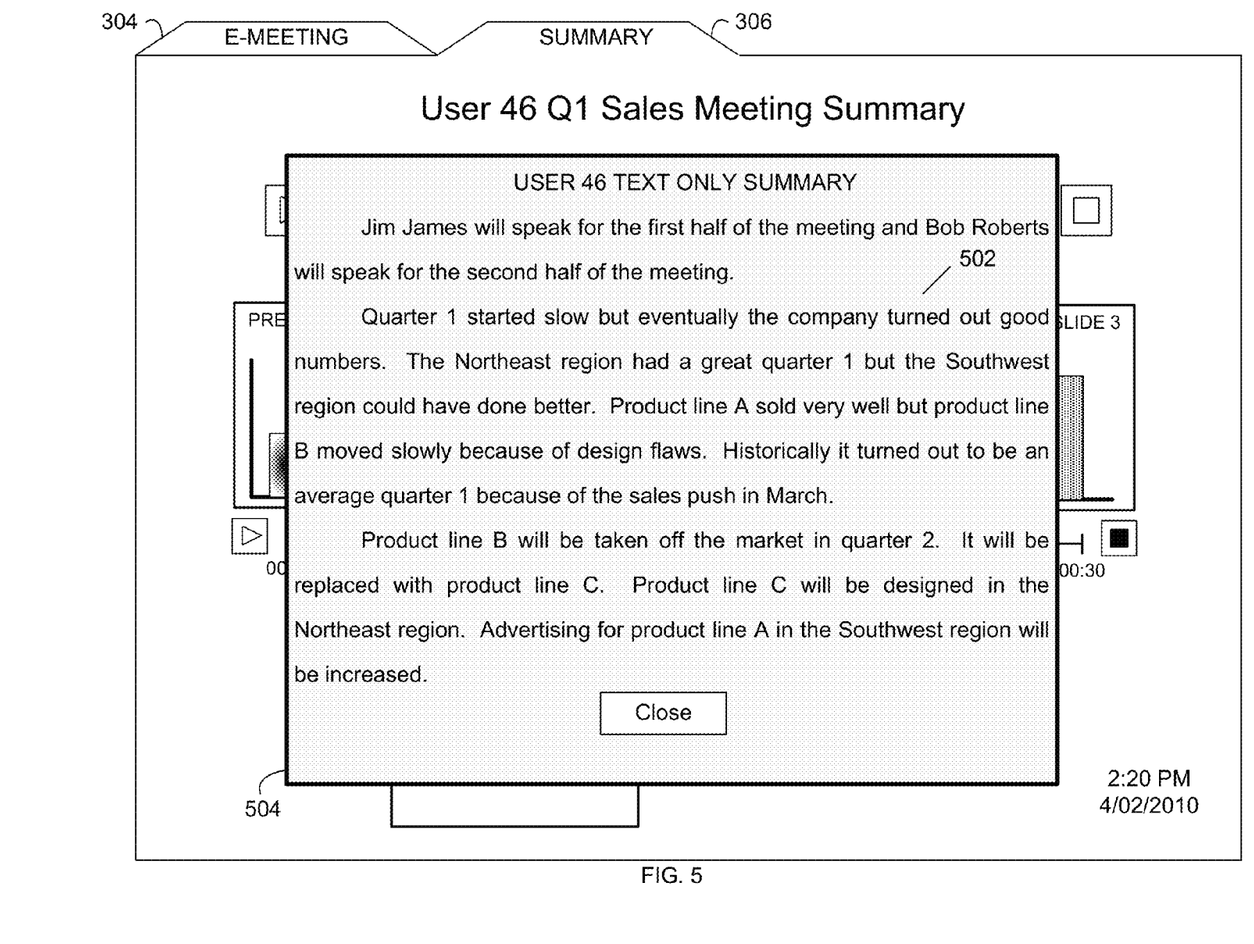
FIG. 5 is also an exemplary graphical user interface which may be associated with the dynamic e-meeting summarization of FIG. 1.

Referring now to FIGS. 4 and 5, in an implementation, the summary (e.g., text content 502) of the e-meeting (e.g., e-meeting 300) may be (120) a text only summary (e.g., text content 502) and a length of the text-only summary (e.g., text content 502) may be based upon, at least in part, the summary-content time-frame (e.g., 2 minutes) for the e-meeting participant (e.g., user 46) and, at least one of: an average reading rate, and the participant's average reading rate. For example, user 46 may select text only button 412 available from GUI 402 in order to receive a text-only summary (e.g., text content 502). In response to receiving a selection of text only button 412, DES process 10 may generate and render text content 502, which may be presented to user 46 via popup window 504. Further, by way of example, and not limitation, DES process 10 may determine that the average reading rate is 6 lines per minute, and may, based on a 2 minute summary-content time-frame, generate text content 502 (e.g., the text-only summary), which may be 12 lines long in order to be consumed by the average user in 2 minutes. Further, user 46's average reading rate, which may be specific to user 46 and known and/or determined by DES process 10, may also be 6 lines per minute. User 46 may also define his/her reading rate via the unified communications and collaboration application.

Moreover, in an implementation, DES process 10 may update (110) the summary (e.g., one or more of audio content 400, presentation content 404, video content 406, and text content 502) of the e-meeting (e.g., e-meeting 300), during the e-meeting, in real-time. As used herein, the term "real-time" may refer to a time proximate to a last time DES process 10 updated it's monitoring of the user's behavior. For example, and as discussed above, user 46 may join e-meeting 300 after e-meeting 300 has begun, and DES process 10 may generate a summary of the portion of e-meeting 300 that user 46 may have missed. User 46 may subsequently leave and rejoin e-meeting 300 a number of times, or may not pay attention to e-meeting 300 while still in it. Based upon this type of behavior being monitored by DES process 10 at a predefined rate (e.g., every 1 second) DES process 10 may update the summary (e.g., one or more of audio content 400, presentation content 404, video content 406, and text content 502) of the e-meeting (e.g., e-meeting 300), during the e-meeting, such that user 46 constantly, in real time, has an updated summary of the e-meeting. Further, assume, for illustrative purposes that user 46 joins a 2 hour long e-meeting 1 hour late. DES process 10 may generate a 6 minute summary for user 46, however, while consuming that 6 minute summary, user 46 may miss an additional 6 minutes of the live e-meeting. DES process 10 may update the summary while user 46 is consuming the summary such that by the time user 46 finishes the summary, it is a 6 minute and 36 second summary covering also the 6 minutes that user 46 spent consuming the initial summary of the e-meeting.

It should be noted that while the summary content of e-meeting 300 has been described above as being available during e-meeting 300, the summary may also be accessible after e-meeting 300 based upon, at least in part, storage and retention preferences set by the moderator of e-meeting 300 and/or an administrator. Further, while the summary content of e-meeting 300 has been described above in connection with user 46, any number of participants on e-meeting 300 may have access to their own, advance prepared summary, based upon, at least in part, their behavior as monitored by DES process 10.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
monitoring, via one or more computing devices, behavior of an e-meeting participant;
determining, via the one or more computing devices, one or more portions of an e-meeting to summarize for the e-meeting participant based upon, at least in part, the behavior of the e-meeting participant;
determining, via the one or more computing devices, a summary-content time-frame for the e-meeting participant based upon, at least in part, the one or more portions of the e-meeting to summarize for the e-meeting participant, wherein the summary-content time-frame is an amount of time for the e-meeting participant to consume a summary of the e-meeting, wherein the summary-content time-frame for the e-meeting participant is determined based upon, at least in part, a defined preference by the e-meeting participant for the amount of time to consume the summary of the e-meeting, wherein the defined preference by the e-meeting participant for the amount of time to consume the summary of the e-meeting includes an amount of time to consume an amount of data exchanged during the e-meeting and an amount of time to consume a type of data exchanged during the e-meeting;
generating, via the one or more computing devices, during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content; and
providing, via the one or more computing devices, the e-meeting participant with access to the summary of the e-meeting, during the e-meeting, via a graphical user interface associated, at least in part, with an application through which the e-meeting is accessed.

2. The method of claim 1, further comprising:
updating the summary of the e-meeting, during the e-meeting, in real-time.

3. The method of claim 1, wherein the summary of the e-meeting is available to the e-meeting participant, at least in part, via a private channel that is non-disruptive to other attendees of the e-meeting.

4. The method of claim 3, wherein at least one of the graphical user interface and the private channel are configured to allow the e-meeting participant to at least one of: pause the summary of the e-meeting, and toggle between the summary of the e-meeting and the e-meeting.

5. The method of claim 1, wherein the behavior of the e-meeting participant used to determine the one or more portions of the e-meeting to summarize for the e-meeting participant is at least in part, at least one of: e-meeting participant attendance, an e-meeting participant join time, an e-meeting participant leave time, an e-meeting participant rejoin time, and an e-meeting participant attention metric.

6. The method of claim 1, wherein the summary-content time-frame for the e-meeting participant is determined based upon, at least in part, at least one of: e-meeting time elapsed, e-meeting time remaining, an amount of content exchanged during the e-meeting, an e-meeting introduction time, and an e-meeting conclusion time.

7. The method of claim 1, wherein the summary of the e-meeting is a text only summary and wherein a length of the text-only summary is based upon, at least in part, the summary-content time-frame for the e-meeting participant and, at least one of: an average reading rate, and the participant's average reading rate.

8. The method of claim 1, wherein providing the e-meeting participant with access to the summary of the e-meeting includes making the summary of the e-meeting available to the participant of the e-meeting when the e-meeting participant joins the e-meeting.

9. The method of claim 1, wherein the summary of the e-meeting includes one or more presentation slides of the e-meeting with corresponding audio content based upon, at least in part, the one or more portions of the e-meeting to summarize for the e-meeting participant and the summary-content time-frame for the e-meeting participant.

10. A computer program product residing on a computer readable storage medium having a plurality of instructions stored thereon, which, when executed by a processor, cause the processor to perform operations comprising:
monitoring behavior of an e-meeting participant;
determining one or more portions of an e-meeting to summarize for the e-meeting participant based upon, at least in part, the behavior of the e-meeting participant;
determining a summary-content time-frame for the e-meeting participant based upon, at least in part, the one or more portions of the e-meeting to summarize for the e-meeting participant, wherein the summary-content time-frame is an amount of time for the e-meeting participant to consume a summary of the e-meeting, wherein the summary-content time-frame for the e-meeting participant is determined based upon, at least in part, a defined preference by the e-meeting participant for the amount of time to consume the summary of the e-meeting, wherein the defined preference by the e-meeting participant for the amount of time to consume the summary of the e-meeting includes an amount of time to consume an amount of data exchanged during the e-meeting and an amount of time to consume a type of data exchanged during the e-meeting;
generating, during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content; and
providing the e-meeting participant with access to the summary of the e-meeting, during the e-meeting, via a graphical user interface associated, at least in part, with an application through which the e-meeting is accessed.

11. The computer program product of claim 10, further comprising:
updating the summary of the e-meeting, during the e-meeting, in real-time.

12. The computer program product of claim 10, wherein the summary of the e-meeting is available to the e-meeting participant, at least in part, via a private channel that is non-disruptive to other attendees of the e-meeting.

13. The computer program product of claim 12, wherein at least one of the graphical user interface and the private channel are configured to allow the e-meeting participant to at least one of: pause the summary of the e-meeting, and toggle between the summary of the e-meeting and the e-meeting.

14. The computer program product of claim 10, wherein the behavior of the e-meeting participant used to determine the one or more portions of the e-meeting to summarize for the e-meeting participant is at least in part, at least one of: e-meeting participant attendance, an e-meeting participant join time, an e-meeting participant leave time, an e-meeting participant rejoin time, and an e-meeting participant attention metric.

15. The computer program product of claim 10, wherein the summary-content time-frame for the e-meeting participant is determined based upon, at least in part, at least one of: e-meeting time elapsed, e-meeting time remaining, an amount of content exchanged during the e-meeting, an e-meeting introduction time, and an e-meeting conclusion time.

16. The computer program product of claim 10, wherein the summary of the e-meeting is a text only summary and wherein a length of the text-only summary is based upon, at least in part, the summary-content time-frame for the e-meeting participant and, at least one of:
an average reading rate, and the participant's average reading rate.

17. The computer program product of claim 10, wherein providing the e-meeting participant with access to the summary of the e-meeting includes making the summary of the e-meeting available to the participant of the e-meeting when the e-meeting participant joins the e-meeting.

18. The computer program product of claim 10, wherein the summary of the e-meeting includes one or more presentation slides of the e-meeting with corresponding audio content based upon, at least in part, the one or more portions of the e-meeting to summarize for the e-meeting participant and the summary-content time-frame for the e-meeting participant.

19. A computing system comprising:
at least one processor;
at least one memory architecture coupled with the at least one processor;
a first software module executable by the at least one processor and the at least one memory architecture, wherein the first software module is configured to monitor behavior of an e-meeting participant;
a second software module executable by the at least one processor and the at least one memory architecture, wherein the second software module is configured to determine one or more portions of an e-meeting to summarize for the e-meeting participant based upon, at least in part, the behavior of the e-meeting participant;
a third software module executable by the at least one processor and the at least one memory architecture, wherein the third software module is configured to determine a summary-content time-frame for the e-meeting participant based upon, at least in part, the one or more portions of the e-meeting to summarize for the e-meeting participant, wherein the summary-content time-frame is an amount of time for the e-meeting participant to consume a summary of the e-meeting, wherein the summary-content time-frame for the e-meeting participant is determined based upon, at least in part, a defined preference by the e-meeting participant for the amount of time to consume the summary of the e-meeting, wherein the defined preference by the e-meeting participant for the amount of time to consume the summary of the e-meeting includes an amount of time to consume an amount of data exchanged during the e-meeting and an amount of time to consume a type of data exchanged during the e-meeting;

a fourth software module executable by the at least one processor and the at least one memory architecture, wherein the fourth software module is configured to generate, during the e-meeting, the summary of the e-meeting in accordance with the summary-content time-frame for the e-meeting participant, the summary of the e-meeting based upon, at least in part, the one or more portions of the e-meeting to summarize for the e-meeting participant and including one or more of presentation content, audio content, text content, and video content; and a fifth software module executable by the at least one processor and the at least one memory architecture, wherein the fifth software module is configured to provide the e-meeting participant with access to the summary of the e-meeting, during the e-meeting, via a graphical user interface associated, at least in part, with an application through which the e-meeting is accessed.

20. The computing system of claim 19, further comprising:
a sixth software module executable by the at least one processor and the at least one memory architecture, wherein the sixth software module is configured to update the summary of the e-meeting, during the e-meeting, in real-time.

21. The computing system of claim 19, wherein the summary of the e-meeting is available to the e-meeting participant, at least in part, via a private channel that is non-disruptive to other attendees of the e-meeting.

22. The computing system of claim 21, wherein at least one of the graphical user interface and the private channel are configured to allow the e-meeting participant to at least one of: pause the summary of the e-meeting, and toggle between the summary of the e-meeting and the e-meeting.

23. The computing system of claim 19, wherein the behavior of the e-meeting participant used to determine the one or more portions of the e-meeting to summarize for the e-meeting participant is at least in part, at least one of: e-meeting participant attendance, an e-meeting participant join time, an e-meeting participant leave time, an e-meeting participant rejoin time, and an e-meeting participant attention metric.

24. The computing system of claim 19, wherein the summary-content time-frame for the e-meeting participant is determined based upon, at least in part, at least one of: e-meeting time elapsed, e-meeting time remaining, an amount of content exchanged during the e-meeting, an e-meeting introduction time, and an e-meeting conclusion time.

25. The computing system of claim 19, wherein the summary of the e-meeting is a text only summary and wherein a length of the text-only summary is based upon, at least in part, the summary-content time-frame for the e-meeting participant and, at least one of: an average reading rate, and the participant's average reading rate.

* * * * *